M. J. NIELSEN.
FEED ROLL FOR GRAIN AND SEED CLEANING MACHINES OR THE LIKE.
APPLICATION FILED MAY 13, 1919.

1,375,228.  Patented Apr. 19, 1921.

INVENTOR:
Marius Johan Nielsen
BY Wm Wallace White
ATT'Y.

UNITED STATES PATENT OFFICE.

MARIUS JOHAN NIELSEN, OF VESTERAABY, DENMARK.

FEED-ROLL FOR GRAIN AND SEED CLEANING MACHINES OR THE LIKE.

1,375,228. Specification of Letters Patent. Patented Apr. 19, 1921.

Application filed May 13, 1919. Serial No. 296,879.

*To all whom it may concern:*

Be it known that I, MARIUS JOHAN NIELSEN, manufacturer, a subject of the King of Denmark, residing at Vesteraaby, in the Kingdom of Denmark, have invented new and useful Improvements in Feed-Rolls for Grain and Seed Cleaning Machines or the like, of which the following is a specification.

The present invention relates to a feed roll for grain and seed cleaning machines or the like. The distinguishing feature of the invention is that the spikes of the roll are adjustable relatively to the roll surface. This property is attained by the spikes being inserted in disks rotatably disposed, in contact with one another, on a shaft fitted with longitudinal ribs or teeth whereby the spikes, depending on the direction of revolution, are pushed outward or withdrawn, if desired entirely inside of the disks, the spikes being fitted with teeth engaging the ribs or teeth of the shaft. The spikes are maintained in the position into which they are adjusted, by means of a locking device which prevents any undesired rotation of the disks about the shaft.

A couple of manners of constructing the invention are shown on the accompanying drawing in which—

Figure 1:
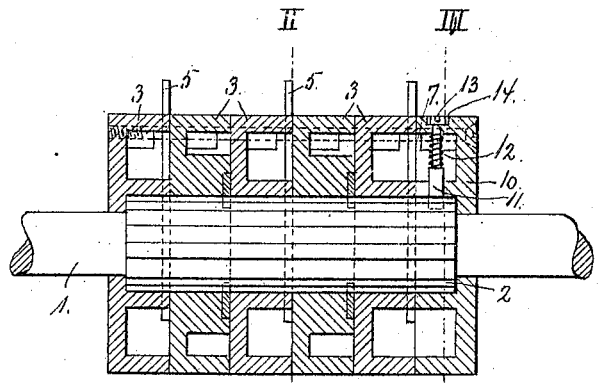
Figure 2:
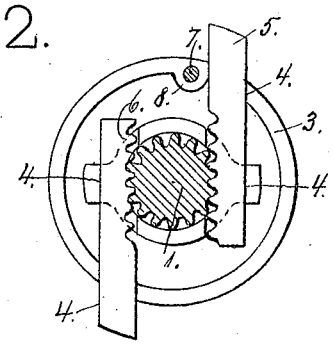
Figure 3:
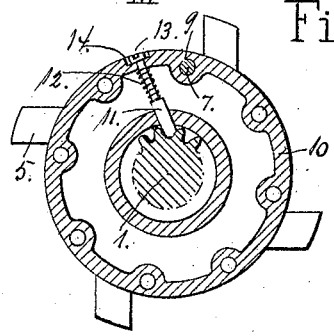
Figure 4:
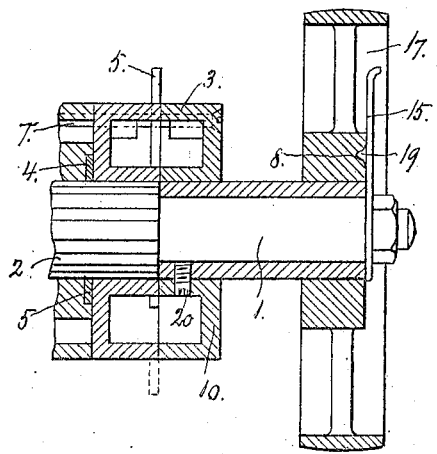

Figure 1 shows a vertical longitudinal section of the feed roll,

Figs. 2 and 3, respectively, sections along the lines II—II and III—III in Fig. 1, and Fig. 4 a vertical longitudinal section of the feed roll illustrating a special construction of the locking device.

1 is the shaft of the feed roll which shaft is reduced in diameter at both ends and is provided, at the center, with longitudinal ribs or teeth 2. 3 are circular disks rotatable about the shaft 1. In one face of each of the disks 3, a pair of recesses 4 are provided for the reception of flat bars 5 forming the spikes, said bars being each provided along one edge thereof, with teeth 6, Fig. 2, adapted to engage the ribs or teeth 2 of the shaft. The disks 3 are held together by a rod 7 passing through holes 8, Fig. 2, in all of the disks and also through a hole 9 in a disk 10, which is also mounted on the shaft 1, but is not fitted with spikes as are the other disks. The holes 8 are offset relatively to each other in relation to the recesses 4, or else there may be several holes in each disk. The rod 7 is threaded at one end, so that it may be screwed into the last disk 3, and it is fitted, at the opposite end, with a screw head with kerf, the said head being countersunk in the disk 10. The last disk 3 and the disk 10 have smaller central bores for the shaft 1 than the other disks, their flanges thereby fitting against the ribbed portion of the shaft, so that the disks are prevented from sliding along the shaft.

11 is a pin passing through holes in the rim and hub of the disk 10 and, actuated by a helical spring 12, into engagement with the ribs or teeth 2 of the shaft 1. The pin 11 is fitted, at its outer end, with a head 13 countersunk in a recess 14 in the rim of the disk 10.

In the modified construction of the feed roll shown in Fig. 4, the pin 11 is replaced by a resilient arm 15 which is fastened to the shaft 1, so that it rotates together with the latter. By means of a screw 20, the disk 10 is fastened to a tube 16 fitting loosely about the shaft 1 and supporting a belt pulley 17. In the hub of the latter there are provided several recesses 18 arranged in a circle and located to receive a lug 19 or the like on the arm 15.

If the length of the spikes is to be changed the shaft 1 in the construction shown in Figs. 1 to 3 is held stationary, while the pin 11 is pulled out of engagement with the teeth 2. The disks 3 and 10, which are held together by the rod 7, may now be turned collectively to the right or left about the shaft 1, whereby the bars or spikes 5 are withdrawn into the disks or pushed outward. When the spikes are adjusted in the desired position, the pin 11 is released, and the pressure of the spring 12 will then cause the inner end of the pin to engage the ribs 2 again.

In the construction of the feed roll shown in Fig. 4, the spikes may be adjusted when the lug 19 of the rod 15 is withdrawn from the recess 18 in the hub of the pulley 17, whereafter the pulley and the sleeve 16 as well as the disks 10 and 3 may be rotated about the shaft 1, which must be held stationary during the adjustment.

Having now particularly described and ascertained the nature of my said invention and in what manner the same is to be performed, I declare that what I claim is:

1. A feed roll for grain cleaning machines, comprising a shaft, a plurality of disk-shaped members revoluble about said shaft as a unit, means for locking said members to the shaft for rotation therewith and releasable to permit independent rotation of said members as a unit, each of said disk members being provided with a pair of apertures extending inward from its periphery and an adjustable bar guided in each of said apertures, the shaft and bars having coöperating means for adjusting the latter when the shaft and disk members are independently rotated.

2. A feed roll for grain cleaning machines, comprising a shaft, a plurality of disk-shaped members revoluble about said shaft, said members being each provided with apertures disposed tangentially in relation to the shaft, a bar slidable in each of said apertures, coöperating means carried by the shaft and bars for causing the bars to slide in the apertures when the disk members are rotated relatively to the shaft, and means for locking the disk members to the shaft and thereby retaining said bars at any adjusted position in said apertures.

3. A feed roll for grain cleaning machines, comprising a shaft, a plurality of disk-shaped members revoluble about said shaft, said members being each provided with apertures disposed tangentially in relation to the shaft, a bar slidable in each of said apertures, said bars and shaft being provided with coöperating teeth for causing the bars to slide in the apertures when the disk members are rotated relatively to the shaft, and means for locking the disk members to the shaft and thereby retaining said bars at any adjusted position in said apertures.

4. A feed roll for grain cleaning machines, comprising a shaft, a plurality of disk-shaped members secured together to form a unit revoluble about the shaft, said members being each provided with apertures disposed tangentially in relation to the shaft, a bar slidable in each of said apertures, said bars and shaft being provided with coöperating teeth for causing the bars to slide in the apertures when the disk unit is rotated relatively to the shaft, said shaft and one of said disk members carrying one a movable stop and the other means adapted to engage said stop thereby to lock said unit to the shaft.

In testimony whereof I have signed my name to this specification.

MARIUS JOHAN NIELSEN.

Witnesses:
V. BEESCHNER,
BERT CARLSEN.